(12) United States Patent
Chang et al.

(10) Patent No.: US 10,643,128 B2
(45) Date of Patent: May 5, 2020

(54) POWER GENERATION PREDICTION SYSTEM AND A METHOD THEREOF

(71) Applicant: TAIWAN POWER COMPANY, Taipei (TW)

(72) Inventors: Chih-Jung Chang, New Taipei (TW); Li-Fen Chou, New Taipei (TW); Yih-Guang Leu, Taipei (TW)

(73) Assignee: Taiwan Power Company, Taipei (TW)

( * ) Notice: Subject to any disclaimer, the term of this patent is extended or adjusted under 35 U.S.C. 154(b) by 15 days.

(21) Appl. No.: 16/027,894

(22) Filed: Jul. 5, 2018

(65) Prior Publication Data

US 2019/0012598 A1    Jan. 10, 2019

(30) Foreign Application Priority Data

Jul. 4, 2017 (TW) .............................. 106122361 A

(51) Int. Cl.
| | |
|---|---|
| *G06N 3/08* | (2006.01) |
| *H02J 3/38* | (2006.01) |
| *G05B 13/02* | (2006.01) |
| *G06N 3/04* | (2006.01) |
| *G06Q 50/06* | (2012.01) |
| *H02J 3/00* | (2006.01) |

(52) U.S. Cl.
CPC ........... *G06N 3/082* (2013.01); *G05B 13/027* (2013.01); *G06N 3/0454* (2013.01); *G06N 3/08* (2013.01); *G06Q 50/06* (2013.01); *H02J 3/383* (2013.01); *H02J 3/386* (2013.01); *H02J 3/003* (2020.01); *H02J 2203/20* (2020.01)

(58) Field of Classification Search
CPC ........ G06N 3/082; G06N 3/0454; G06N 3/08; H02J 3/383; H02J 3/386; H02J 2003/007; H02J 2003/003; G05B 13/027; G06Q 50/06
See application file for complete search history.

(56) References Cited

U.S. PATENT DOCUMENTS

| | | | |
|---|---|---|---|
| 2010/0185337 A1* | 7/2010 | Le Pivert | G06Q 10/04 700/291 |
| 2011/0066401 A1* | 3/2011 | Yang | G01J 1/4228 702/184 |
| 2012/0029712 A1* | 2/2012 | Parikh | G01W 1/10 700/287 |
| 2012/0035887 A1* | 2/2012 | Augenbraun | G06T 15/06 703/1 |
| 2013/0060472 A1* | 3/2013 | Parikh | G01W 1/10 702/3 |

(Continued)

*Primary Examiner* — Charles R Kasenge
(74) *Attorney, Agent, or Firm* — Rosenberg, Klein & Lee

(57) ABSTRACT

A power generation prediction system using a first neural network and a second neural network is provided, and the first neural network is connected to the second neural network. The first neural network receives first input data, and generates the amount prediction data according to the first input data. The first input data is used to determine amount prediction data, and the amount prediction data is used to determine power generation prediction data. The second neural network receives the amount prediction data, and calculates the power generation prediction data according to the amount prediction data. When a device in a selected area is deteriorated or reinstalled, the second neural network is fine-tuned and trained again.

8 Claims, 8 Drawing Sheets

(56) References Cited

U.S. PATENT DOCUMENTS

| | | | | |
|---|---|---|---|---|
| 2013/0085885 A1* | 4/2013 | Sahai | ............... | G06Q 50/06 |
| | | | | 705/26.4 |
| 2013/0096856 A1* | 4/2013 | Caffrey | ............... | G05B 13/048 |
| | | | | 702/61 |
| 2013/0214534 A1* | 8/2013 | Nakamura | ............... | F03D 7/00 |
| | | | | 290/44 |
| 2014/0188410 A1* | 7/2014 | Kerrigan | ............... | H02J 3/383 |
| | | | | 702/61 |
| 2014/0195159 A1* | 7/2014 | Mewes | ............... | G01W 1/02 |
| | | | | 702/3 |
| 2014/0244188 A1* | 8/2014 | Bai | ............... | F03D 17/00 |
| | | | | 702/60 |
| 2014/0344209 A1* | 11/2014 | Fang | ............... | G06N 7/005 |
| | | | | 706/52 |
| 2015/0006080 A1* | 1/2015 | Yamazaki | ............... | G01W 1/10 |
| | | | | 702/3 |
| 2015/0039228 A1* | 2/2015 | Wang | ............... | G01W 1/00 |
| | | | | 702/3 |
| 2016/0187910 A1* | 6/2016 | Moreno | ............... | G06Q 10/06 |
| | | | | 700/297 |
| 2016/0190984 A1* | 6/2016 | Caine | ............... | H02S 50/00 |
| | | | | 702/60 |
| 2016/0223600 A1* | 8/2016 | Wang | ............... | G01R 21/133 |
| 2017/0337495 A1* | 11/2017 | Ghosh | ............... | G06Q 10/06375 |
| 2018/0340515 A1* | 11/2018 | Huyn | ............... | F03D 9/257 |

* cited by examiner

The first computing device uses the first neural network to process the first input data associated with the wind amount prediction, and generate the wind amount prediction data according to the first input data, and the first input data associated with the wind amount prediction can include meteorological data and wind amount observation data ~S71

The second computing device uses the second neural network to process the wind amount prediction data, and generate the power generation prediction data ~S73

POWER GENERATION PREDICTION SYSTEM AND A METHOD THEREOF

CROSS-REFERENCE TO RELATED APPLICATION

This application claims the benefit of Taiwan Patent Application No. 106122361, filed on Jul. 4, 2017, in the Taiwan Intellectual Property Office, the disclosure of which is incorporated herein in its entirety by reference.

BACKGROUND OF THE INVENTION

1. Field of the Invention

The present invention generally relates to a power generation prediction system and a method thereof, and more particularly to a power generation prediction system using multiple neural networks, and a method thereof.

2. Description of the Related Art

Currently, a variety of power generation manners are developed, such as solar power generation, wind power generation, tidal power generation, ocean current power generation, geothermal power generation, coal-fired power generation, hydroelectric power generation, and nuclear power generation. The amount of electricity generated by coal-fired power generation and nuclear power generation can be controlled by humans, regardless of the weather and time, so the coal-fired power generation and the nuclear power generation are considered relatively stable manners of power generation. However, solar power generation and wind power generation are easily affected by weather and time, and have relatively unstable power generation.

A power deployment terminal in a power grid can deploy power (that is, a power generation amount) generated by a plurality of power generation terminals, so that the power can be effectively used by power consumption terminals without wasting power. However, the amount of power generated by the solar power generation terminal and the wind power generation terminal is not stable, so it is difficult for the power deployment terminal to efficiently perform power deployment. Therefore, a power generation prediction system and method capable of predicting the future generation of power in a selected area are required to enable the deployment terminal to effectively perform power deployment according to the predicted power generation amount.

A conventional power generation prediction system uses only one neural network for prediction. For example, when applied to the solar power generation, the neural network receives all input data associated with power generation prediction, such as solar irradiance observation data obtained by a pyranometer, and generates a prediction result about power generation according to the input data. However, a pyranometer may deteriorate or be re-installed, and it may result in changes in solar irradiance observation data. Therefore, programmers need to fine-tune and train a large neural network again when the pyranometer has deteriorated or is re-installed. It leads to high time consumption and inconvenience for the programmers.

SUMMARY OF THE INVENTION

In order to solve aforementioned conventional problems, the present invention provides a power generation prediction system using multiple neural networks, and a method thereof. The system and method can be implemented by an electronic device with general computation capability in cooperation with a specific software algorithm, or, implemented by an electronic device including multiple hardware circuits, such as, application specific integrated circuits (ASIC) or field programmable gate arrays (FPGA).

According to an embodiment, the present invention provides a power generation prediction system. The power generation prediction system comprises a first computing device and a second computing device electrically connected to each other. The first computing device uses a first neural network to process first input data to generate the amount prediction data according to the first input data. The first input data is used to determine the amount prediction data, and the amount prediction data is configured to determine the power generation prediction data. The second computing device uses a second neural network to process the amount prediction data to calculate the power generation prediction data according to the amount prediction data. When a device for power generation in an area deteriorates or is reinstalled, the second neural network can be fine-tuned and trained again.

According to an embodiment, the power generation prediction system comprises a third computing device electrically connected to the second computing device. The third computing device uses a third neural network to process the second input data to generate the power generation module parameter prediction data according to the second input data. The second input data is used to determine the power generation module parameter prediction data, and the power generation module parameter prediction data is configured to correct the power generation prediction data. The second computing device uses the second neural network to receive the power generation module parameter prediction data, and calculate the power generation prediction data according to the power generation module parameter prediction data and the amount prediction data.

According to an embodiment, the present invention provides a power generation prediction method adapted to a power generation prediction system using multiple neural networks. The power generation prediction method includes following steps of: processing the first input data by using a first neural network to generate the amount prediction data according to the first input data, wherein the first input data is used to determine the amount prediction data, and the amount prediction data is used to determine the power generation prediction data; processing the amount prediction data by using a second neural network to calculate the power generation prediction data according to the amount prediction data, wherein the second neural network is connected to the first neural network; when a device in a selected area is deteriorated or reinstalled, the second neural network can be fine-tuned and trained again.

According to an embodiment, the method further includes steps of: processing the second input data by using a third neural network to generate the power generation module parameter prediction data according to the second input data, wherein the second input data is used to determine the power generation module parameter prediction data, and the power generation module parameter prediction data is used to correct the power generation prediction data; processing the power generation module parameter prediction data by using the second neural network to calculate the power generation prediction data according to the amount prediction data and the power generation module parameter prediction data, wherein the third computing device is electrically connected to the second computing device.

According to above-mentioned contents, the power generation prediction system and method thereof can have at least one of the following advantages.

First, when the device in the selected area is deteriorated or reinstalled, the programmer just needs to fine tune and train the second neural network again, thereby reducing time consumption of fine-tuning and training the neural network again.

Secondly, the system uses multiple neural networks, and when the device in the selected area is deteriorated or reinstalled, the programmer can just fine tune and train the second neural network again, so as to facilitate the programmer to fine tune and train neural network without checking large neural network.

BRIEF DESCRIPTION OF THE DRAWINGS

The structure, operating principle and effects of the present invention will be described in detail by way of various embodiments which are illustrated in the accompanying drawings.

FIG. 7 is a flow chart of a wind power generation prediction method of an embodiment of the present invention.

DETAILED DESCRIPTION OF THE PREFERRED EMBODIMENTS

Figure 1A:
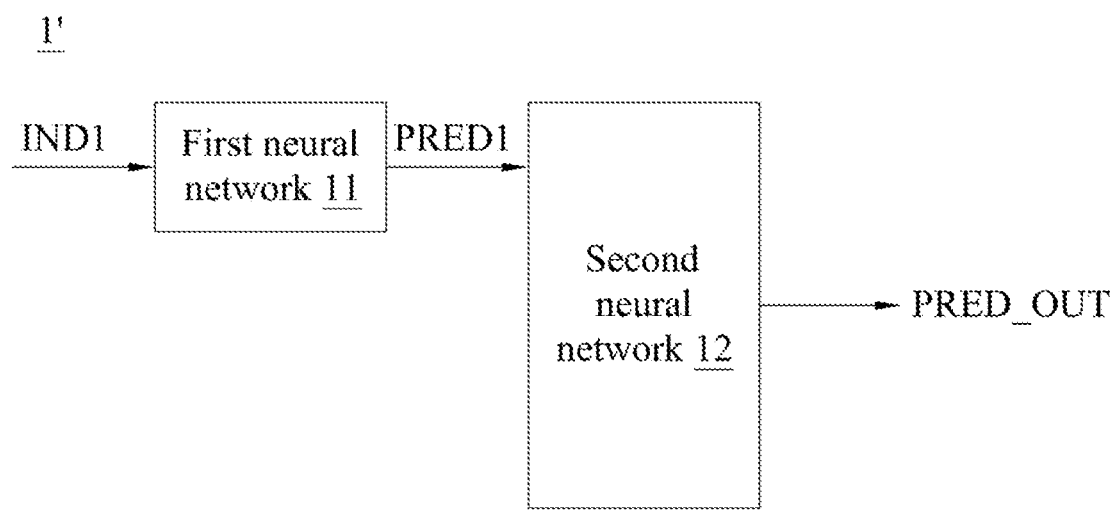
FIG. 1A is a block diagram of a power generation prediction system of an embodiment of the present invention.

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be understood to imply the inclusion of stated elements but not the exclusion of any other elements.

Generally, solar power generation is proportional to solar irradiance; however, the solar irradiance may be affected by substances in the air, such as clouds or particles. Therefore, solar power generation is usually an intermittent and time-varying and is unable to provide a stable source of electricity. When the solar power generation network is merged into the power grid without predicting possible power in advance, it may easily lead to instability of the power system, and it is not easy to carry out power deployment, thereby increasing operating investment and operating costs. Therefore, what is needed is to develop a system and method that is able to predict the amount of solar power generated for a selected area.

According to an embodiment, the present invention provides a power generation prediction system using multiple neural networks, and a method thereof. The system and method can be used to predict solar power generation in a selected area. The power generation prediction system and the method thereof is not limited to be applied in prediction for solar power generation, and can also be used to predict other-type power generation, such as wind power generation. The solar power generation is taken as example. Because of deterioration or reinstallation of a pyranometer, solar irradiance observation data obtained by the pyranometer may be inaccurate. For this reason, the prediction for solar power generation must consider the deterioration or reinstallation of the pyranometer, and the neural network can be fine-tuned and trained again if necessary.

In order to prevent consuming too much time and causing inconvenience to programmer, the power generation prediction system includes at least two neural networks including a first neural network and a second neural network. The output nodes of the first neural network are connected to the input nodes of the second neural network, and the second neural network can calculate the power generation prediction data in consideration of deterioration and reinstallation of certain device. Therefore, when the power generation conversion curve is changed because of deterioration or reinstallation of the device, the programmer only needs to fine-tune and train the second neural network again without changing the first neural network, so as to reduce time consumption and facilitate the programmer to solve the problem.

In a case of solar power generation, for example, the device, which may be reinstalled or deteriorated, can be a part or all of devices of a pyranometer or solar power generation equipment (such as, a photoelectric conversion module formed by multiple solar panels). In a case of wind power generation, for example, the device can be a part or all of devices (such as a fan blade of wind power generator) of a wind meter or wind power generation equipment (such as, a wind power generator). When the power generation conversion curve is affected by reinstallation or deterioration of any device and the power generation conversion curve is changed, the second neural network can be fine-tuned and trained again.

Please refer to FIG. 1A, which is a block diagram of a power generation prediction system of an embodiment of the present invention. The power generation prediction system 1' includes multiple neural networks including a first computing device performing a first neural network 11, and a second computing device performing a second neural network 12. The output nodes of the first neural network 11 are connected to the input nodes of the second neural network 12. The power generation prediction system 1' can be used to predict power generation of the wind power generation system in a selected area; however, the present invention is not limit thereto, and the power generation prediction system can further be used to predict power generation of other power generation system in the selected area. Furthermore, the power generation prediction system 1' can be implemented by a computing device executing software, or implemented by specific hardware circuit; however, the present invention is not limit thereto.

Figure 1B:
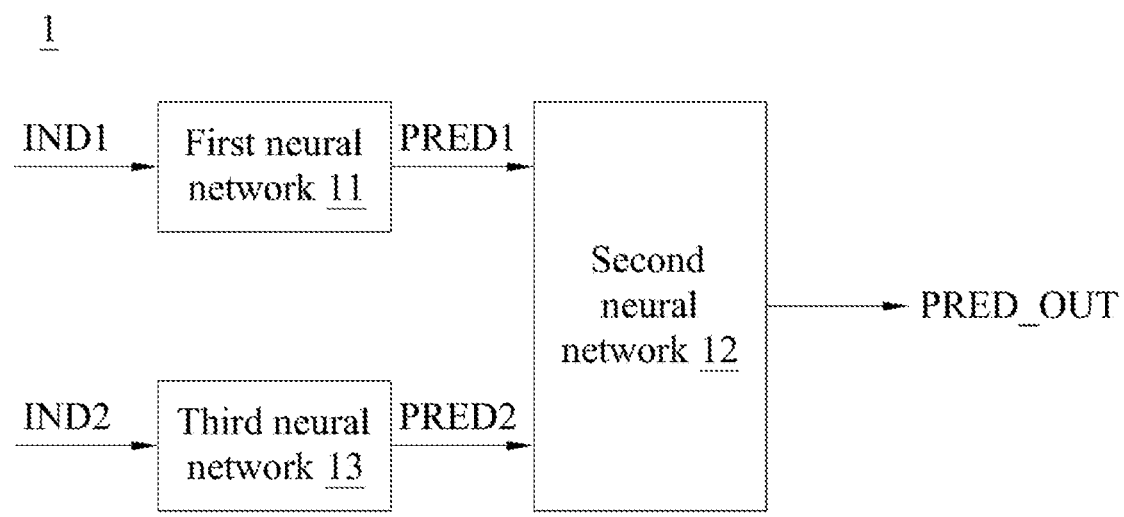
FIG. 1B is a block diagram of a power generation prediction system of another embodiment of the present invention.

Please refer to FIG. 1B, which is a block diagram of a power generation prediction system of another embodiment of the present invention. The power generation prediction system 1 uses multiple plurality of neural networks including the first computing device performing the first neural network 11, the second computing device performing the second neural network 12, and a third computing device performing a third neural network 13. The output nodes of the first neural network 11 and the third neural network 13 are connected to the input nodes of the second neural network 12. The power generation prediction system 1 can be used to predict power generation of the solar power system in the selected area; however, the present invention is not limited thereto, and the system can further be used to predict power generation of other power generation systems in a selected area. Furthermore, the power generation prediction system 1 can be implemented by a computing units executing software, or implemented by specific hardware circuit; however, the present invention is not limit thereto. The first computing device, the second computing device, and the third computing device can be implemented by at least one processor, for example, by single processor, or by a distribution manner using different processors distributed in interconnected computer systems.

Figure 2:
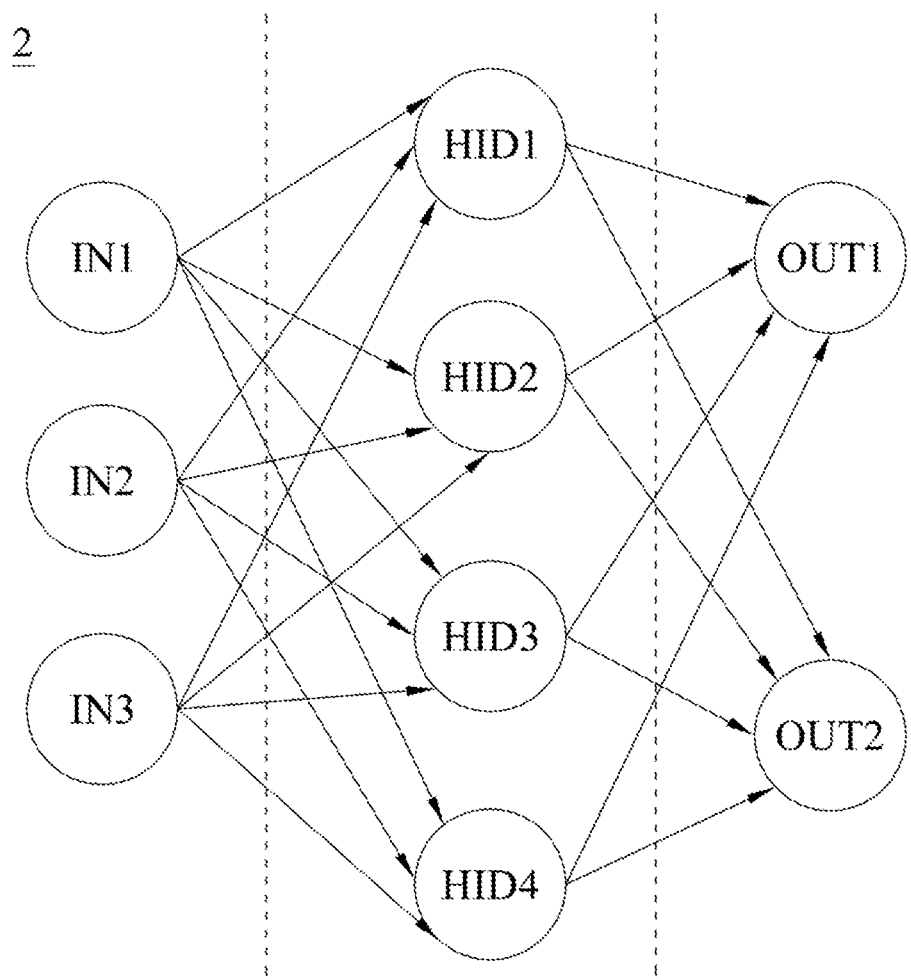
FIG. 2 is a schematic view of a neural network of an embodiment of the present invention.

Please refer to FIG. 2, which is a schematic view of a neural network of an embodiment of the present invention. The first to third neural networks 11 to 13 of FIGS. 1A and 1B can be implemented by the neural network 2 shown in FIG. 2, and the neural network 2 includes a plurality of input nodes IN1 to IN3, a plurality of hidden nodes HID1 to HID4, and a plurality of output nodes OUT1 to OUT3. The plurality of input nodes IN1 to IN3s are electrically connected to the plurality of hidden nodes HID1 to HID4, and the plurality of hidden nodes HID1 to HID4 are electrically connected to the plurality of output nodes OUT1 to OUT3. The plurality of input nodes IN1 to IN3s are configured to receive the input data, and the plurality of output nodes OUT1 to OUT3 are configured to output the processed data, and the plurality of hidden nodes can perform an activation function for processing the data.

It should be noted that, in this embodiment, the hidden nodes HID1 to HID4 are performed by one layer only, but the present invention is not limited thereto. The neural network structure of FIG. 2 is merely an exemplary neural network, and a person having ordinary skill in the art can know the neural network structure of FIG. 2 is not limited the first to third neural networks 11 to 13 of FIG. 1.

Please refer to FIG. 1A. The input nodes of the first neural network 11 can receive the first input data IND1, the hidden nodes of the first neural network 11 can process the first input data IND1 to generate amount prediction data PRED1, and the output nodes of the first neural network 11 can output the amount prediction data PRED1. It should be noted that, the first input data IND1 can include any data which may affect the amount prediction data PRED1, and the amount prediction data PRED1 can be used to determine the power generation prediction data PRED_OUT.

For example, in the power generation prediction data PRED_OUT, multiple predict power generation values at different time points (such as the time points of leading 1 hour to 48 hours, respectively; however, the present invention is not limited thereto) are determined by the multiple predicted amount values at different time points (such as the time points of leading 1 hour to 48 hours, respectively; however, the present invention is not limited thereto) of the amount prediction data PRED1. In a case of wind power generation, the first input data IND1 can comprise the meteorological data and the wind amount observation data, and the amount prediction data PRED1 can include wind amount prediction data (that is, the predicted amount value is the wind amount prediction value), and the power generation prediction data PRED_OUT is wind power generation prediction data.

The input nodes of the second neural network 12 can receive the amount prediction data PRED1, the hidden nodes of the second neural network 12 can process the amount prediction data PRED1 to generate the power generation prediction data PRED_OUT, and the output nodes of the second neural network 12 can output the power generation prediction data PRED_OUT, so that the deployment terminal in the electric power grid can deploy power of the power generation terminal according to the power generation prediction data PRED_OUT.

It should be noted that some devices of the power generation system may deteriorated over time or be reinstalled, and it may change the relationship equation between the power generation and the amount value of the power generation module and the power generation module parameters, that is, the power generation conversion curve may be changed. As a result, the relationship equation between the power generation and amount value of the power generation module and the power generation module parameters must be adjusted and corrected, that is, the power generation conversion curve must be corrected. In an embodiment, the second neural network 12 is designed in consideration of the deterioration over time or reinstallation of at least one device, so the approximation function the second neural network 12 trained by learning process can establish the accurate relationship equation between the power generation and amount value of the power generation module and the power generation module parameters; in the other words, the second neural network 12 can be fine-tuned and trained again, to generate the correct power generation conversion curve.

The power generation prediction system 1' of the present invention is formed by the first neural network 11 and the second neural network 12 which are not too large, and the second neural network 12 can be fine-tuned and trained again only when some devices are deteriorated over time or reinstalled, so as to update the accurate relationship equation between the power generation and amount value of the power generation module, and the power generation module parameter. As a result, compared with the conventional power generation system using one neural network only, the power generation prediction system 1' of the present invention can reduce time consumption in fine-tuning and training the neural network, so as to facilitate the programmer to maintain the neural network and solve the problem.

It should be noted that when the power generation system is a wind power generation system, the device which may deteriorate over time or be reinstalled can be a wind meter. When the wind meter is reinstalled or has deteriorated, the measured wind amount observation data may be different from the wind amount observation data measured by the wind meter which is not deteriorated or reinstalled, so the second neural network 12 must be fine-tuned and trained again, thereby adjusting the relationship equation between power generation of the power generation module and wind amount.

For the wind power generation, the power generation conversion curve is a relationship curve between wind speed and power generation, and when the wind meter is deteriorated, the relationship curve between wind speed and power generation may be changed, so the second neural network 12 must be fine-tuned and trained again. According to above-mentioned content, when at least one of components of the wind power generator is reinstalled or deteriorated, the relationship curve between wind speed and power generation may also be changed, so the second neural network 12 can also be fine-tuned and trained again.

Please refer to FIG. 1B. Compared with FIG. 1A, the power generation prediction system of FIG. 1B further includes the third computing device performing the third neural network 13, and the function of the first neural network 11 of the FIG. 1B is the same as that of FIG. 1A, so the detailed description is not repeated. For solar power generation, the first input data IND1 of FIG. 1B includes meteorological data, the solar irradiance observation data, the solar irradiance calculation data of a selected area, and the amount prediction data PRED1 can includes solar irradiance prediction data (that is, the predicted amount value is solar irradiance prediction value), and a power generation prediction data PRED_OUT is solar power generation prediction data.

As shown in FIG. 1B, the input nodes of the third neural network 13 can receive the second input data IND2, the hidden nodes of the third neural network 13 can process the second input data IND2 to generate the power generation module parameter prediction data PRED2, and the output nodes of the third neural network 13 can output the power generation module parameter prediction data PRED2. It should be noted that the second input data IND2 includes any data which may affect the power generation module parameter prediction data PRED2, and the power generation module parameter prediction data PRED2 can be used to correct the power generation prediction data PRED_OUT.

In the power generation prediction data PRED_OUT, the predict power generation values at different time points (such as, the time points of leading 1 hour to 48 hours, respectively; however, the present invention is not limited thereto) may be affected by the multiple module parameter prediction values at different time points (such as, the time points of leading 1 hour to 48 hours, respectively; however, the present invention is not limited thereto) in the power generation module parameter prediction data PRED2, but the effect is less than that caused by the aforementioned predicted amount values. Therefore, the power generation module parameter prediction data PRED2 can be used to correct the power generation prediction data PRED_OUT. For solar power generation, the second input data IND2 can comprise the meteorological data and the temperature observation data, and the power generation module parameter prediction data PRED2 can include temperature prediction data, that is, the module parameter prediction value is a temperature prediction value.

When the power generation system is a solar power system, the device which may be deteriorated over time or reinstalled can be a pyranometer. When the pyranometer is reinstalled or deteriorated, the measured solar irradiance observation data may be different from the solar irradiance observation data measured by the pyranometer which is not deteriorated or reinstalled, that is, the power generation conversion curve may be changed, so the second neural network 12 must be fine-tuned and trained again, thereby adjusting the relationship equation between power generation of the power generation module, solar irradiance and temperature, that is, adjusting the power generation conversion curve.

For solar power generation, the power generation conversion curve is a relationship curve between solar irradiance and power generation, and when the pyranometer is deteriorated, relationship curve between solar irradiance and power generation may be changed, so the second neural network 12 must be fine-tuned and trained again. According to above-mentioned content, the relationship curve between solar irradiance and power generation may also be changed when at least one of components of the solar power generation equipment is reinstalled or deteriorated, and the second neural network 12 must be fine-tuned and trained again.

Figure 3:
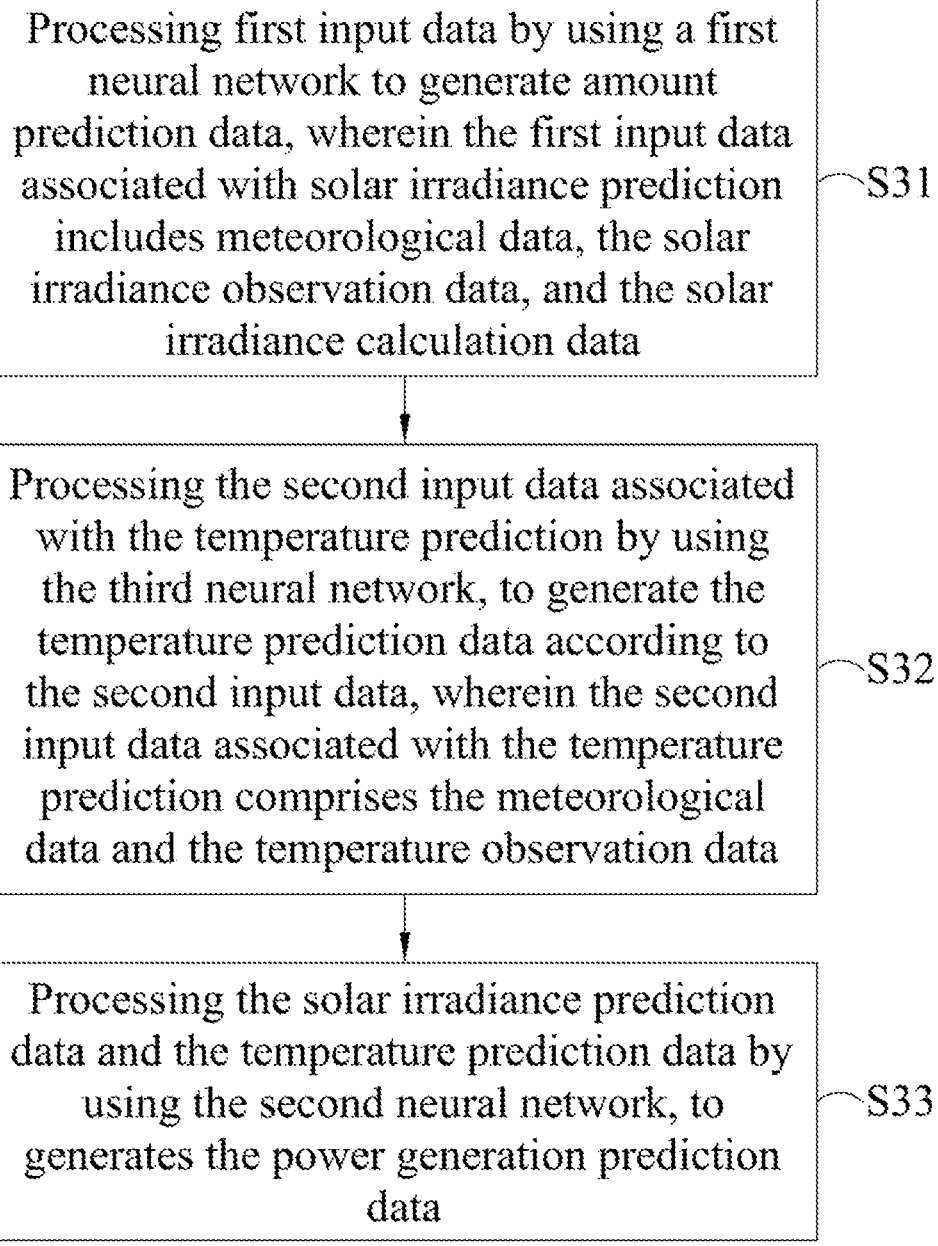
FIG. 3 is a flow chart of a solar power generation prediction method of an embodiment of the present invention.

Please refer to FIG. 3, which is a flow chart of a solar power generation prediction method of an embodiment of the present invention. In this embodiment, the solar power generation prediction method is implemented by power generation prediction system of FIG. 1B, and includes steps S31 to S33. In the step S31, the first computing device uses the first neural network to process the first input data associated with solar irradiance prediction, and generates the solar irradiance prediction data according to the first input data. The first input data associated with solar irradiance prediction includes meteorological data, the solar irradiance observation data, and the solar irradiance calculation data of the selected area.

The meteorological data includes satellite cloud image information, temperature information, weather information, and so on; and, the solar irradiance observation data includes the solar irradiance observation values of the solar power facilities in the selected area, for example, the solar irradiance observation value directly measured by the pyranometer, the solar irradiance observation value deduced from the power generation of the known power generation terminal, and the solar irradiance observation value calculated by the weather station according to the radiation amount. Furthermore, the solar irradiance calculation data of the selected area includes solar irradiance values of the selected area calculated according to the solar irradiance observation values of the solar irradiance observation data, and the manner of calculating the solar irradiance value can refer to the descriptions for FIGS. 4 to 6, so the detailed description is not repeated.

Next, in the step S32, the third computing device uses the third neural network to process the second input data associated with the temperature prediction, and generate the temperature prediction data according to the second input data, wherein the second input data associated with the temperature prediction comprises the meteorological data and the temperature observation data. The temperature observation data can be temperature observation values of the solar power facilities in the selected area, such as the temperature observation value of the pyranometer, the known power generation terminal or the weather station. The power generation of the solar power generation module is positively correlated to the solar irradiance substantially; however, because of the effect of temperature, the conversion rate of the solar power generation module may be changed, and the temperature prediction data must be obtained to correct the power generation prediction data.

In the step S33, the second computing device uses the second neural network to process the solar irradiance prediction data and the temperature prediction data, and generates the power generation prediction data according to the solar irradiance prediction data and the temperature prediction data. Furthermore, according to above-mentioned content, it needs to correct the relationship equation of the second neural network used for generate the power generation prediction data (that is, the second neural network is fine-tuned and trained again) only when the pyranometer or at least one of devices of or solar power generation equipment is deteriorated or reinstalled.

Figure 4:
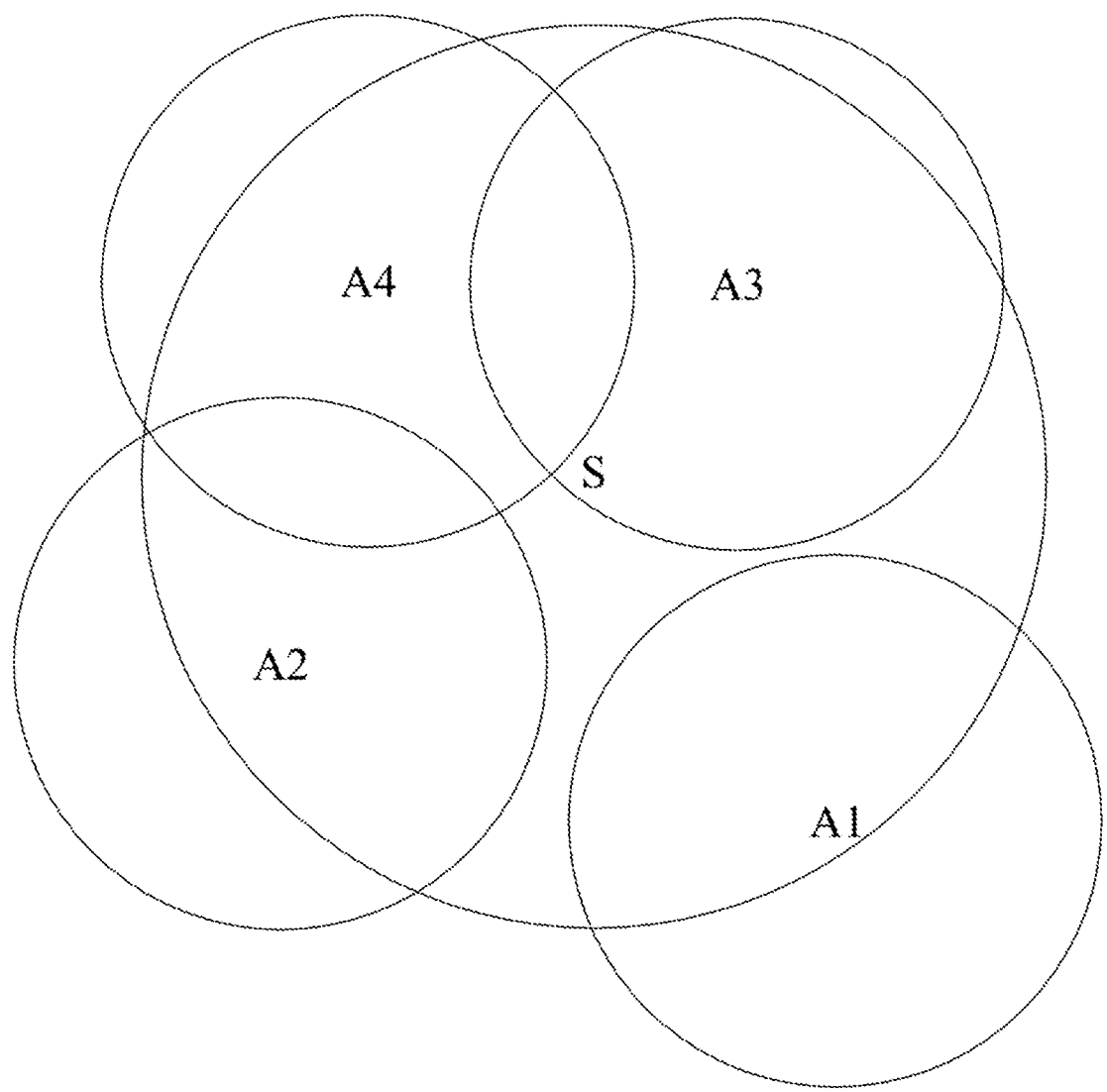
FIG. 4 is a schematic view of a selected area, and areas occupied by solar power facilities located around the selected area, and shapes of the areas, according to an embodiment of the present invention.

Please refer to FIG. 4, which is a schematic view of the selected area, and areas and area shapes of the solar power facilities located around the selected area, according to an embodiment of the present invention. The selected area S can be automatically selected by system, or selected by the deployment terminal. In this embodiment, the selected area S is circular, and the solar power facilities in the selected area S are the solar power facilities which has areas A1 to A4 overlapping with the selected area S. In this embodiment, the solar power facilities in the areas A1 to A4 are known solar power generation terminals, weather stations or pyranometers; however, the present invention is not limit thereto.

Figure 5:
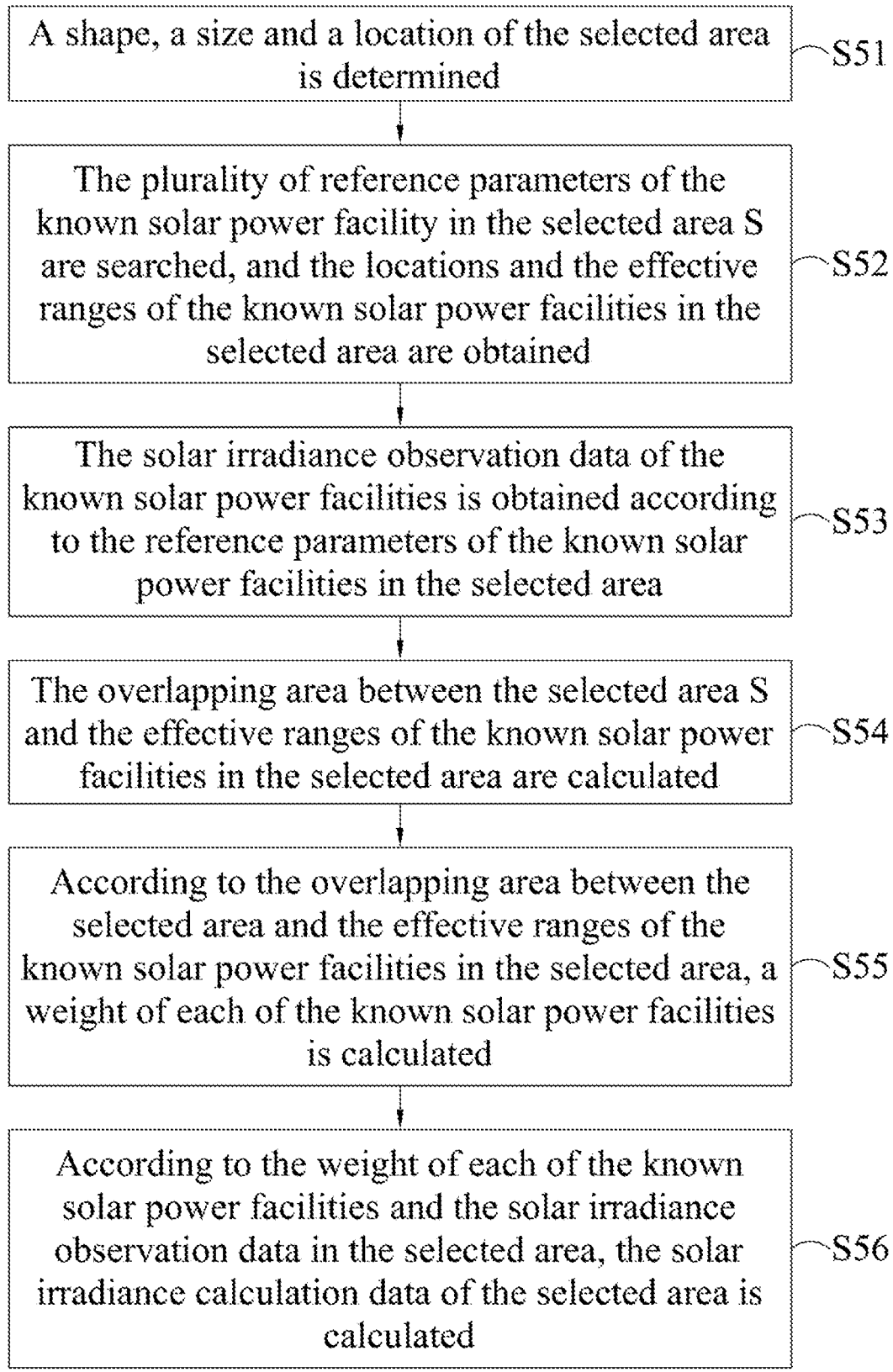
FIG. 5 is a flow chart of an operation of calculating solar irradiance calculation data of the selected area, according to an embodiment of the present invention.

Please refer to FIGS. 4 and 5. FIG. 5 is a flow chart of an operation of calculating solar irradiance calculation data of the selected area, according to an embodiment of the present invention, and this operation includes steps S51 to S56. First, in the step S51, a shape, a size and a location of the selected area is determined, and the location includes a longitude and a latitude, and may include a height. For example, the user in the deployment terminal can determine the selected area S manually. It should be noted that, the operation of determining the shape, the size and the location of the selected area can also be automatically performed by a computing device.

In the step S52, the plurality of reference parameters of the known solar power facility in the selected area S (such as, the solar power facilities in areas A1 to A4) are searched, and the locations and the effective ranges of the known solar power facilities in the selected area S are obtained. The reference parameters can be solar irradiance of the known pyranometer, solar power generation of the solar power generation, radiation amount of the weather station, meteorological data of the weather station (such as, satellite cloud image) in the area.

In the step S53, the solar irradiance observation data of the known solar power facilities is obtained according to the reference parameters of the known solar power facilities in the selected area S, that is, the solar irradiance observation data of the areas A1 to A4 is obtained. Next, in the step S54, the overlapping area between the selected area S and the effective ranges of the known solar power facilities in the selected area S are calculated, that is, the overlapping areas between the selected area S and the areas A1 to A4 are calculated.

Next, in the step S55, according to the overlapping area between the selected area and the effective ranges (the areas A1 to A4) of the known solar power facilities in the selected area S, a weight Wi of each of the known solar power facilities is calculated, for example, Wi=Oi/(O1+O2+O3+O4), wherein Oi is an overlapping area between the area Ai and the selected area S, and i is an integer in a range of 1 to 4. In the step 56, according to the weight Wi of each of the known solar power facilities and the solar irradiance observation data Ii (that is, the solar irradiance observation data in area Ai) in the selected area S, the solar irradiance calculation data Is of the selected area is calculated, wherein Is=W1×I1+W2×I2+W3×I3+W4×I4.

Figure 6:
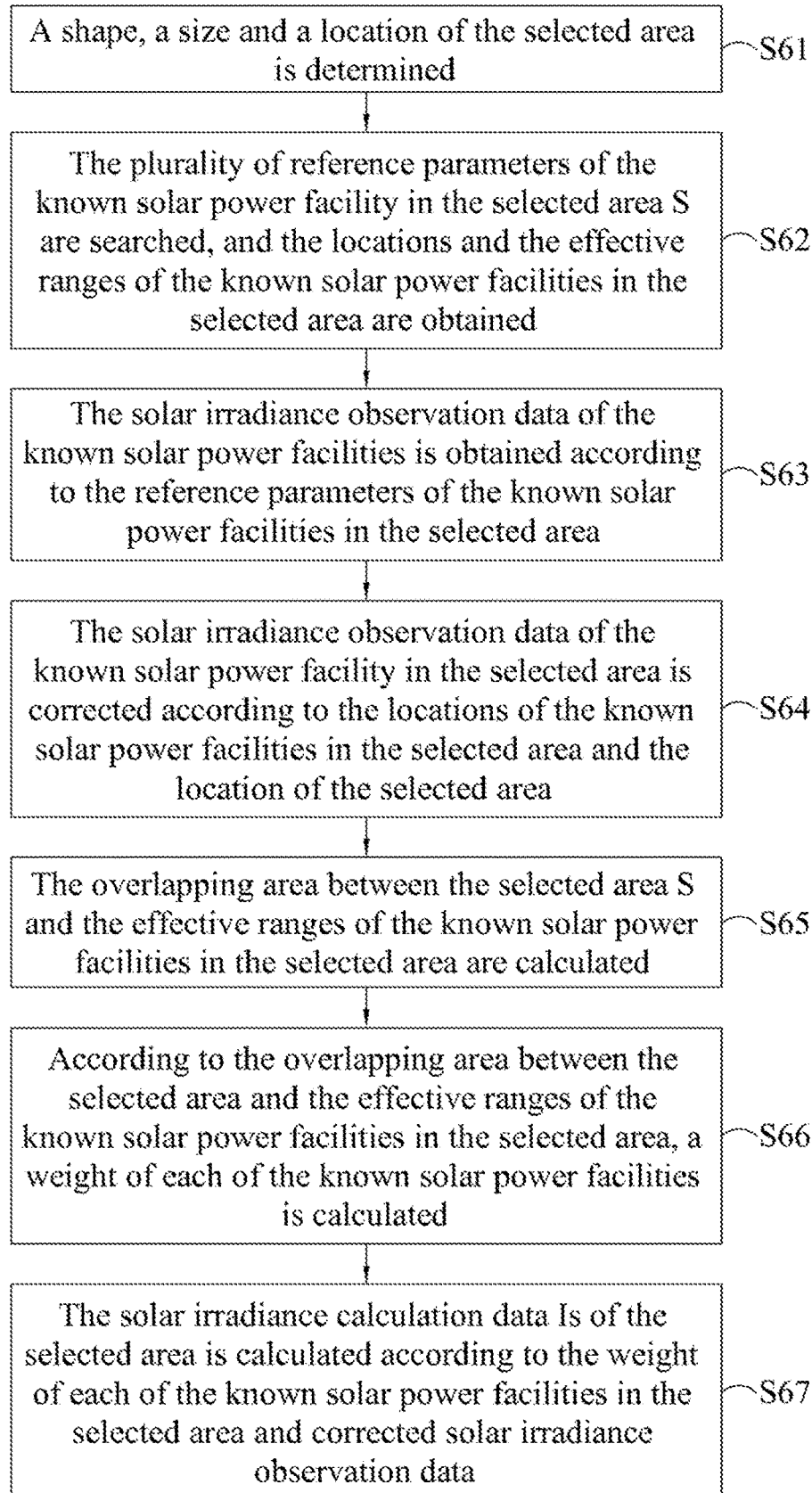
FIG. 6 is a flow chart of an operation of calculating solar irradiance calculation data of selected area, according to another embodiment of the present invention.

Please refer to FIGS. 4 and 6. FIG. 6 is a flow chart of an operation of calculating solar irradiance calculation data of selected area, according to another embodiment of the present invention. Different from FIG. 5, the flow of the operation of calculating the solar irradiance calculation data of the selected area shown in FIG. 6 further consider the location of the area S (for example, the location includes the longitude, the latitude and the height), and the solar irradiance observation data Ii is corrected according to the height of the selected area S, and the solar irradiance calculation data Is of the selected area S can be calculated according to the corrected solar irradiance observation data Ii.

The steps S61 to S63 are the same as the steps S51 to S53 of FIG. 5, so the detailed descriptions are not repeated. In the step S64, the solar irradiance observation data of the known solar power facility in the selected area S is corrected according to the locations of the known solar power facilities in the selected area S and the location of the selected area S. Generally, the differences between the longitudes and the latitudes of selected area S and the areas A1 to A4 may not affect the solar irradiance calculation data Is of the selected area S, but the heights of the pyranometers, the solar power generation terminals or the weather stations in the areas A1 to A4 may be different from the height of the selected area S, so the solar irradiance observation data Ii must be corrected.

The steps S65 and S66 are the same the steps S54 and S55 of FIG. 5, so the detailed descriptions are not repeated. Next, in the step S67, the solar irradiance calculation data Is of the selected area is calculated according to the weight Wi of each of the known solar power facilities in the selected area S and corrected solar irradiance observation data wherein Is=W1 I1'+W2×I2'+W3×I3'+W4×I4'. It should be noted that the manner of calculating the solar irradiance calculation data Is of the selected area S in these two embodiments are merely for exemplary illustration, and the present invention is not limited to these examples.

The power generation prediction method of the present invention can also be applied to predict wind power generation. Please refer to FIG. 7, which is a flow chart of a wind power generation prediction method of an embodiment of the present invention. In this embodiment, the wind power generation prediction method is implemented by the power generation prediction system of FIG. 1A, and includes steps S71 to S72. In the step S71, the first computing device uses the first neural network to process the first input data associated with the wind amount prediction, and generate the wind amount prediction data according to the first input data, and the first input data associated with the wind amount prediction can include meteorological data and wind amount observation data.

The meteorological data can include wind direction and wind speed, and the wind amount observation data can include the wind amount observation values of the facilities in the selected area, such as the wind amount observation value directly measured by the wind meter, or the wind amount observation value deduced from the power generation of the known power generation terminal.

In the step S72, the second computing device uses the second neural network to process the wind amount prediction data, and generate the power generation prediction data according to the wind amount prediction data. Furthermore, according to above-mentioned content, the relationship equation of the second neural network for generating the power generation prediction data must be corrected (that is, the second neural network is fine-tuned and trained again) when the wind meter or at least one of the components of the wind power generator is deteriorated or reinstalled.

It should be noted that, the power generation prediction system and the method thereof are described according to examples of solar power generation or wind power generation, but the present invention is not limited thereto. Furthermore, that deterioration or reinstallation of the wind meter and the pyranometer may affect the relationship equation for generation of the power generation prediction data is taken as an example, but the present invention is not limited thereto; and, when deterioration or reinstallation of other device may also affect the relationship equation for generation of power generation prediction data, the second neural network may also be designed in consideration of the reinstallation or deterioration of this device, that is, when this device is the deteriorated or reinstalled, the second neural network can be fine-tuned and trained again to adjust and correct the relationship equation for generation of the power generation prediction data.

In summary, according to an embodiment, the present invention provides a power generation prediction system using multiple neural networks, and a method thereof, and while one of the neural networks is used to calculate the power generation prediction data, the internal weights may be in response to the deterioration or reinstallation of certain device, so as to more easily keep the relationship equation of the neural network for calculation of the power generation prediction data correct. As a result, when the device is deteriorated or reinstalled, the programmer only needs to fine-tune and train one of the neural networks again without fine-tuning and training all neural networks; in the other words, the power generation prediction system and the method thereof can effectively reduce time consumption of fine-tuning and training the neural network, so as to facilitate the programmer to solve the problem.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A power generation prediction system, applicable to an area where a plurality of devices are installed for power generation with a power generation conversion curve, and the power generation prediction system comprising:
   a first computing device configured to receive first input data, and use a first neural network to generate amount prediction data according to the first input data, wherein the first input data comprises meteorological data and used to determine the amount prediction data, and the amount prediction data is used to determine power generation prediction data;
   a second computing device connected to the first computing device and configured to receive the amount prediction data, and use a second neural network to perform an approximation function to calculate the power generation prediction data according to the amount prediction data; and
   a third computing device connected to the second computing device, and configured to receive second input data, and use a third neural network to generate a power generation module parameter prediction data according to the second input data, wherein the second input data is used to determine the power generation module parameter prediction data, and the power generation module parameter prediction data is used to correct the power generation prediction data;
   wherein the second computing device configured to receives the power generation module parameter prediction data, and uses the second neural network to perform the approximation function to calculate the power generation prediction data according to the amount prediction data and the power generation module parameter prediction data;
   wherein when the power generation conversion curve is affected by deterioration or reinstallation of at least one of the plurality of devices in the area, the second neural network is fine-tuned and trained again to update the approximation function thereof;
   wherein the area is used for solar power generation, and the first input data comprises multiple pieces of solar irradiance observation data and solar irradiance calculation data of the area, and the second input data comprises meteorological data and multiple pieces of temperature observation data, and the power generation module parameter prediction data comprises temperature prediction data, and the plurality of devices comprise a pyranometer and multiple components of solar power generation equipment.

2. The power generation prediction system according to claim 1, wherein the solar irradiance calculation data is determined by operations of:
   determining a shape, a size and a location of the area;
   searching multiple reference parameters of a known solar power facility in the area, and obtaining a location and an effective range of the known solar power facility in the area;
   according to the reference parameters of the known solar power facility in the area, obtaining the solar irradiance observation data of the known solar power facility;
   calculating an overlapping area between the area and the effective range of the known solar power facility in the area;
   according to the overlapping area between the area and the effective range of the known solar power facility in the area, calculating a weight of the known solar power facility; and according to the weight of the known solar power facility and the solar irradiance observation data in the area, calculating the solar irradiance calculation data of the area.

3. The power generation prediction system according to claim 1, wherein the solar irradiance calculation data is determined by operations of:
- determining a shape, a size and a location of the area;
- searching multiple reference parameters of a known solar power facility in the area, and obtaining a location and an effective range of the known solar power facility in the area;
- according to the multiple reference parameters of the known solar power facility in the area, obtaining the solar irradiance observation data of the known solar power facility;
- according to a location of the known solar power facility in the area and the location of the area, correcting the solar irradiance observation data of the known solar power facility in the area;
- calculating an overlapping area between the area and the effective range of the known solar power facility in the area;
- according to the overlapping area between the area and the effective range of the known solar power facility in the area, calculating a weight of the known solar power facility; and
- according to the weight of the known solar power facility in the area and the corrected solar irradiance observation data, calculating the solar irradiance calculation data of the area.

4. The power generation prediction system according to claim 3, wherein the solar irradiance observation data of the known solar power facility in the area is corrected according to a height of the known solar power facility in the area and a height of the area.

5. A power generation prediction method, applicable to an area where a plurality of devices are installed for power generation with a power generation conversion curve, and the power generation prediction method comprising:
- processing first input data by using a first neural network to generate amount prediction data, wherein the first input data comprises meteorological data, the first input data is used to determine the amount prediction data, and the amount prediction data is used to determine power generation prediction data;
- processing the amount prediction data by using a second neural network to perform an approximation function to calculate the power generation prediction data, wherein the second neural network is connected to the first neural network; and
- processing second input data by using a third neural network to generate a power generation module parameter prediction data, wherein the second input data is used to determine the power generation module parameter prediction data, and the power generation module parameter prediction data is used to correct the power generation prediction data;
- wherein the amount prediction data and the power generation module parameter prediction data are processed by the second neural network according to the approximation function to calculate the power generation prediction data;
- wherein when the power generation conversion curve is affected by deterioration or reinstallation of at least one of the plurality of devices in the area, the second neural network is fine-tuned and trained again to update the approximation function thereof;
- wherein the area is for solar power generation, the first input data comprises multiple pieces of solar irradiance observation data and a solar irradiance calculation data of the area, the second input data comprises the meteorological data and multiple pieces of temperature observation data, the power generation module parameter prediction data comprises temperature prediction data, and the plurality of devices comprise a pyranometer and multiple components of solar power generation equipment.

6. The power generation prediction method according to claim 5, wherein the solar irradiance calculation data is determined by operations of:
- determining a shape, a size and a location of the area;
- searching multiple reference parameters of the known solar power facility in the area, and obtaining a location and an effective range of the known solar power facility in the area;
- according to the multiple reference parameters of the known solar power facility in the area, obtaining the solar irradiance observation data of the known solar power facility;
- calculating an overlapping area between the area and the effective range of the known solar power facility in the area;
- according to the overlapping area between the area and the effective range of the known solar power facility in the area, calculating a weight of the known solar power facility; and
- according to the weight of the known solar power facility and the solar irradiance observation data in the area, calculating the solar irradiance calculation data of the area.

7. The power generation prediction method according to claim 5, wherein the solar irradiance calculation data is determined by operations of:
- determining a shape, a size and a location of the area;
- searching multiple reference parameters of the known solar power facility in the area, and obtaining a location and an effective range of the known solar power facility in the area; according to the multiple reference parameters of the known solar power facility in the area, obtaining the solar irradiance observation data of the known solar power facility;
- according to a location of the known solar power facility in the area and a location of the area, correcting the solar irradiance observation data of the known solar power facility in the area; calculating an overlapping area between the area and the effective range of the known solar power facility in the area;
- according to the overlapping area between the area and the effective range of the known solar power facility in the area, calculating a weight of the known solar power facility; and
- according to the weight of the known solar power facility in the area and the corrected solar irradiance observation data, calculating the solar irradiance calculation data of the area.

8. The power generation prediction method according to claim 7, wherein the solar irradiance observation data of the known solar power facility in the area is corrected according to a height of the known solar power facility in the area and a height of the area.

* * * * *